(12) United States Patent
Lutz

(10) Patent No.: US 11,347,511 B2
(45) Date of Patent: May 31, 2022

(54) FLOATING-POINT SCALING OPERATION

(71) Applicant: Arm Limited, Cambridge (GB)

(72) Inventor: David Raymond Lutz, Austin, TX (US)

(73) Assignee: Arm Limited, Cambridge (GB)

( * ) Notice: Subject to any disclaimer, the term of this patent is extended or adjusted under 35 U.S.C. 154(b) by 463 days.

(21) Appl. No.: 16/416,453

(22) Filed: May 20, 2019

(65) Prior Publication Data

US 2020/0371805 A1 Nov. 26, 2020

(51) Int. Cl.
*G06F 9/30* (2018.01)

(52) U.S. Cl.
CPC ........ *G06F 9/30167* (2013.01); *G06F 9/3001* (2013.01); *G06F 9/30036* (2013.01)

(58) Field of Classification Search
None
See application file for complete search history.

(56) References Cited

U.S. PATENT DOCUMENTS

| | | | | |
|---|---|---|---|---|
| 6,131,104 A * | 10/2000 | Oberman | ................ | G06F 7/483 708/204 |
| 6,233,595 B1 * | 5/2001 | Cheng | ................... | G06F 7/4876 708/503 |
| 7,461,117 B2 * | 12/2008 | Trong | ..................... | G06F 7/483 708/501 |
| 8,019,805 B1 * | 9/2011 | Sarma | ................... | G06F 7/4876 708/627 |
| 8,447,800 B2 * | 5/2013 | Dockser | .............. | G06F 7/49915 708/501 |
| 9,146,901 B2 * | 9/2015 | Nystad | .................... | G06F 17/10 |
| 9,836,279 B2 | 12/2017 | Lutz | | |
| 10,346,133 B1 * | 7/2019 | Danysh | ................. | G06F 7/5324 |
| 2006/0101244 A1 * | 5/2006 | Siu | ....................... | G06F 9/30021 712/221 |
| 2006/0179093 A1 * | 8/2006 | Powell | ............... | G06F 7/49936 708/204 |
| 2010/0274990 A1 * | 10/2010 | Wilder | ................. | G06F 9/3001 712/22 |
| 2013/0246496 A1 * | 9/2013 | Craske | ............... | G06F 9/30036 708/495 |

OTHER PUBLICATIONS

Muller,J. et a., Handbook or Floating Point Arithmetic, 2018,Birkhauser, 2nd Ed. 624 pages. (Year: 2018).*
Saadat, H. etal., Minimally Biased Multipliers for Approximate Integer and Floating-Point Multiplication, 2018,IEEE, pp. 2623-2635. (Year: 2018).*
Gustafson, J.L. eta al., Beating Floating Point at its Own Game: Posit Arithmetic, 2017, SuperFri.org., pp. 71-86. (Year: 2017).*

* cited by examiner

*Primary Examiner* — Eric Coleman
(74) *Attorney, Agent, or Firm* — Nixon & Vanderhye P.C.

(57) ABSTRACT

An apparatus has floating-point multiplying circuitry to perform a floating-point multiply operation to multiply first and second floating-point operands to generate a product floating-point value. Shared hardware circuitry of the floating-point multiplying circuitry is reused to also support a floating-point scaling instruction specifying an input floating-point operand and an integer operand, which causes a floating-point scaling operation to be performed to generate an output floating-point value corresponding to a product of the input floating-point operand and a scaling factor $2^X$, where X is an integer represented by the integer operand.

16 Claims, 6 Drawing Sheets

FSCALE Zd, Pg, Zm

| | 3 | 2 | 1 | 0 |
|---|---|---|---|---|
| Pg | 1 | 1 | 0 | 1 |

| | | | | |
|---|---|---|---|---|
| Zd | FP[3] | FP[2] | FP[1] | FP[0] |

| | | | | |
|---|---|---|---|---|
| Zm | Int[3] | Int[2] | Int[1] | Int[0] |

FP[3] x $2^{Int[3]}$   FP[2] x $2^{Int[2]}$   Masked   FP[0] x $2^{Int[0]}$

| | 3 | 2 | 1 | 0 |
|---|---|---|---|---|
| Zd' | FP'[3] | FP'[2] | FP'[1] | FP'[0] |

FLOATING-POINT SCALING OPERATION

BACKGROUND

Technical Field

The present technique relates to the field of data processing. More particularly, it relates to processing of floating-point operations.

Technical Background

A data processing apparatus may provide support for a processing numbers represented in a floating-point representation in which a number is represented using a fraction F, an exponent E and a sign bit S. The sign bit S represents whether the floating-point number is positive or negative. The significand 1.F or 0.F represents the significant digits of the floating-point number. The exponent E represents the position of a radix point (also known as a binary point) relative to the significand. Hence, by varying the value of the exponent, the radix point can float left and right within the significand, so that for a predetermined number of bits, a floating-point representation can represent a wider range of numbers than a fixed-point representation for which the radix point has a fixed location within the significand.

SUMMARY

At least some examples provide an apparatus comprising:
an instruction decoder to decode instructions; and
processing circuitry to perform data processing in response to the instructions decoded by the instruction decoder; in which:
the processing circuitry comprises floating-point multiplying circuitry to perform, in response to a floating-point multiply instruction decoded by the instruction decoder, a floating-point multiply operation to multiply first and second floating-point operands to generate a product floating-point value;
in response to a floating-point scaling instruction specifying an input floating-point operand and an integer operand, the instruction decoder is configured to control the processing circuitry to perform a floating-point scaling operation to generate an output floating-point value corresponding to a product of the input floating-point operand and a scaling factor $2^X$, where X is an integer represented by the integer operand; and
the processing circuitry is configured to perform the floating-point scaling operation using shared hardware circuitry of the floating-point multiplying circuitry which is also used for performing the floating-point multiply operation in response to the floating-point multiply instruction.

At least some examples provide an apparatus comprising:
means for decoding instructions; and
means for performing data processing in response to the instructions decoded by the means for decoding; in which:
the means for performing data processing comprises means for floating-point multiplication to perform, in response to a floating-point multiply instruction decoded by the means for decoding, a floating-point multiply operation to multiply first and second floating-point operands to generate a product floating-point value;
in response to a floating-point scaling instruction specifying an input floating-point operand and an integer operand, the means for decoding is configured to control the means for performing data processing to perform a floating-point scaling operation to generate an output floating-point value corresponding to a product of the input floating-point operand and a scaling factor $2^X$, where X is an integer represented by the integer operand; and
the means for performing data processing is configured to perform the floating-point scaling operation using shared hardware circuitry of the means for floating-point multiplication which is also used for performing the floating-point multiply operation in response to the floating-point multiply instruction.

At least some examples provide, a data processing method comprising:
decoding an instruction; and
performing data processing in response to the decoded instruction; in which:
when the decoded instruction is a floating-point multiply instruction, floating-point multiplying circuitry is controlled to perform a floating-point multiply operation to multiply first and second floating-point operands to generate a product floating-point value; and
when the decoded instruction is a floating-point scaling instruction specifying an input floating-point operand and an integer operand, a floating-point scaling operation is performed to generate an output floating-point value corresponding to a product of the input floating-point operand and a scaling factor $2^X$, where X is an integer represented by the integer operand;
wherein the floating-point scaling operation is performed using shared hardware circuitry of the floating-point multiplying circuitry which is also used for performing the floating-point multiply operation in response to the floating-point multiply instruction.

Further aspects, features and advantages of the present technique will be apparent from the following description of examples, which is to be read in conjunction with the accompanying drawings.

DESCRIPTION OF EXAMPLES

Figure 1:
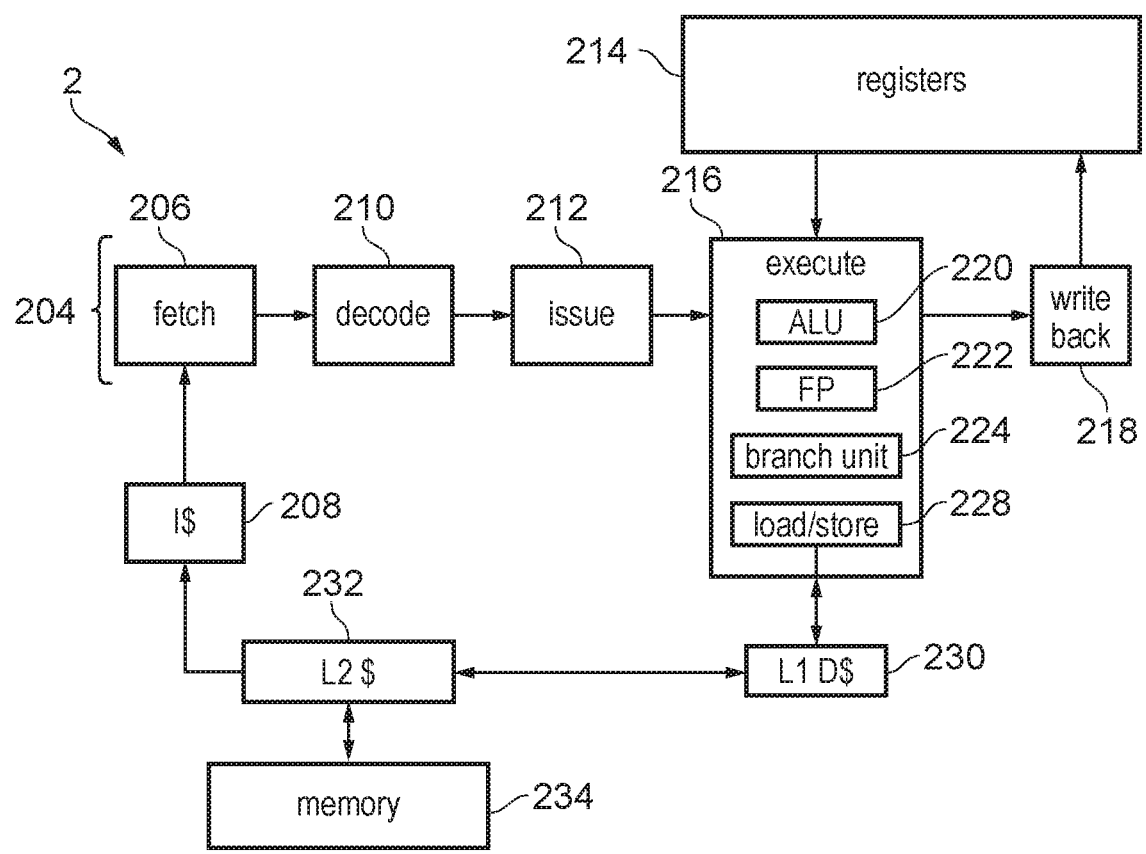
FIG. 1 schematically illustrates an example of a data processing apparatus.

A data processing apparatus may have processing circuitry, including floating-point multiplying circuitry. In response to an instruction decoder decoding a floating-point multiply instruction which specifies first and second floating-point operands, the instruction decoder may control the floating-point multiplying circuitry to perform a floating-point multiply operation to multiply the first and second floating-point operands to generate a product floating-point value.

Another type of floating-point operation which may be supported may be a floating-point scaling operation. A floating-point scaling instruction may specify an input floating-point operand and an integer operand. In response to the floating-point scaling instruction, the instruction decoder may control the processing circuitry to perform a floating-point scaling operation to generate an output floating-point value which corresponds to a product of the input floating-point operand and a scaling factor $2^X$, where X is an integer represented by the integer operand. Such a floating-point scaling operation can be useful for simulating multiplication of a floating-point number by a power of two which is too large or too small to be represented as a floating-point number itself. For example, it may be desired to multiply a floating-point number by $2^{2000}$, which cannot be represented using a floating-point number in double-precision (DP) floating-point representation (the maximum exponent in DP is 1023). The multiplication by $2^{2000}$ could be simulated using the floating-point scaling instruction, because the range of values which can be represented by an integer operand may be wider than the range of exponent values allowed for the floating-point number. Although the scaling factor itself may be too large or too small to be represented as a floating-point number, for at least some values of the input floating-point operand, the product of the input floating-point operand with the scaling factor may be a finite value which can be represented as a finite (non-saturating) output floating-point value.

Such a scaling operation could be useful, for example, if the programmer recognises that the floating-point numbers to be processed in a given section of code may be likely to be near the outer bound of the range of values which can be represented in the floating-point format, so that it is likely that multiplying or adding those values together may lead to overflows or underflows. By scaling the floating-point values to be processed using the floating-point scaling operation, the values can be brought further away from the outer reaches of the range representable in the floating-point format, so that it is less likely that overflows or underflows will occur when other floating-point operations are applied to the rescaled floating-point values resulting from the floating-point scaling operations.

In the techniques discussed below, the processing circuitry may perform the floating-point scaling operation using shared hardware circuitry of the floating-point multiplying circuitry which is also used for performing the floating-point multiply operation in response to the floating-point multiplying instruction. This can reduce circuit area and power consumption by avoiding the need for as much separate logic provided in hardware. One might think that reusing the floating-point multiplying circuitry to perform the floating-point scaling operation would be overkill, because on the face of it the floating-point scaling operation may seem to require only an adjustment of the exponent of the input floating-point operand based on the scaling factor to generate the exponent of the output floating-point value, with the significand being mapped unchanged from the input floating-point operand to the output floating-point operand. One might think that invoking the multiplying circuitry would therefore incur an unnecessary power cost, when an addition of the exponent and the scaling factor may be enough. However, the inventor recognised that while this may be the most common case, there are some less common corner cases which may require more complex operations, and these corner cases may be similar to corner cases which may arise in a floating-point multiply operation, so that it can be useful to share some of the hardware circuitry of the floating-point multiplying circuitry for also dealing with the corner cases which could arise in the floating-point scaling operation. By using shared hardware circuit logic for both operations, this saves circuit area and power compared to an implementation which provided separate circuit units for the respective operations.

More particularly, the shared hardware circuitry may comprise at least one of: subnormal handling circuitry to handle subnormal inputs or outputs of the floating-point multiply operation or the floating-point scaling operation; and rounding determination circuitry to determine a rounding increment to be applied to an output of the floating-point multiply operation or the floating-point scaling operation.

Circuit logic for handling subnormal inputs/outputs and/or rounding can represent a relatively large proportion of the overall circuit logic overhead of a floating-point multiplier. Rounding may be used when the result of a multiplication cannot be represented exactly within the available number of bits of the significand of the floating-point being used. Subnormal floating-point values are values which are too small to be represented using a normal floating-point value, which has a significand with a most significant bit of 1, but which can be represented by a floating-point value with the minimum possible exponent and a significand which contains one or more leading zeroes. The IEEE floating-point format defines subnormal values, but some processor implementations may choose not to provide dedicated hardware circuit logic for dealing with subnormals, and in that case subnormal values could be handled instead with software fix-ups. However, such software checks and adjustments may be slow, so in implementations which provide subnormal handling circuitry in hardware, this can allow floating-point multiplications to be performed much faster even when the input or output of the floating-point multiply operation is subnormal. This can allow both normal and subnormal cases to be processed with the same latency, which can be very useful for guaranteeing a certain level of performance. However, the circuit overhead in detecting whether either the input or the output of a floating-point multiply operation is subnormal, and if either is subnormal applying a suitable correction to the significand and/or exponent of the result, can be relatively expensive in hardware.

For the floating-point scaling operation, it is also possible that the input floating-point operand could be subnormal, and/or the product of the input floating-point operand and the scaling factor could be subnormal depending on the values of the exponent of the input floating-point operand and the scaling factor defined by the integer operand. Hence, by reusing subnormal handling circuitry provided for handling subnormal inputs or outputs of the floating-point multiply operation to also handle subnormal inputs or outputs of the floating-point scaling operation, this can provide a great circuit area saving (and hence power consumption reduction), compared to implementations which separate the circuit unit for performing the scaling operation from the circuit unit which performs the multiply.

Also, in cases where there is a subnormal input or output for the floating-point scaling operation, then this may result in some bits of the significand of the input floating-point operand being shifted out of range when the floating-point scaling operation is performed, and so it can also be useful to share rounding determination circuitry (which is provided for determining rounding increments for the floating-point multiply operation) so that it can also determine rounding increments to be applied for the floating-point scaling operation. Again this may provide a circuit area saving by reusing the same circuit hardware logic for both operations.

By providing hardware circuitry for handling subnormal inputs/outputs and rounding, this means the latency associated with the floating-point scaling operation can be the same regardless of whether the input and output floating-point operands are normal or subnormal. This would not be possible if software fixups were used to deal with subnormal inputs/outputs. In implementations which provide hardware circuit logic for detecting and dealing with subnormal values, it can be particularly useful for the floating-point scaling operation to reuse the shared hardware circuitry of the floating-point multiplying circuitry which is also used for the floating-point multiply operations, as the subnormal handling circuitry and rounding determination circuitry may represent a relatively significant area cost and so avoiding duplication of this hardware circuitry for the multiply and scaling operations respectively can provide a reasonable circuit area and power saving.

The floating-point multiplying circuitry may include a multiplier array, which in response to the floating-point multiply instruction is controlled by the instruction decoder to add partial products which have been generated based on significands of the first and second floating-point operands to be multiplied. For example the multiplier array may comprise an array of carry save adders which add the partial products together. Each partial product may be a multiple of the significand of one of the first/second floating-point operands, where the multiple is selected based on a subset of bits selected from the significand of the other floating-point operand, for example using a Booth encoding scheme.

For the floating-point scaling operation, such an addition of partial products may not be required, since the significand of the input floating-point operand can either remain unchanged in the output floating-point operand, or be subject to a shift (and possibly a rounding increment) to correct for subnormal inputs or outputs. However, to invoke the shared hardware circuitry of the floating-point multiplying circuitry for dealing with subnormal inputs/outputs or rounding, it may be desirable if the significand of the input floating-point operand for the floating-point scaling operation is able to be injected onto the same circuit signal paths to the subnormal handling circuitry or rounding determination circuitry which would be used if a product value is actually generated by the multiplier array when performing a floating-point multiply operation. There are different ways in which this can be done.

In one example, in response to the floating-point scaling instruction, the instruction decoder may control the multiplier array to add partial products generated based on a significand of the input floating-point operand and a predetermined constant significand in which only a single bit is set to 1. By multiplying by a significand which has only one bit set to 1, this effectively multiplies by a power of 2, so would not result in a change to the significant bits of the significand of the input floating-point operand, as desired for the floating-point scaling operation. Hence, in this example the multiply array still performs its sequence of additions of partial products, but effectively one of the inputs has been fixed to a power-of-2 value. In particular, it can be useful if the predetermined constant significand is equal to the significand of a floating-point value which would represent a numeric value of 1, since this means the product generated by the multiplier array represents the same value as the significand of the input floating-point operand (1*N=N). Using a constant representing 1 is simpler because it means the exponent processing does not need to add an adjustment factor to the result exponent to compensate for the power of 2 used in the multiplier. Nevertheless, it would also be possible to use a predetermined constant significand which represents a power of 2 other than 1, and in this case the output of the multiplier array may effectively represent the significand of the input floating-point operand shifted by one or more bit positions, in which case a corresponding adjustment of exponents can be performed to compensate for this shift. Either way, with this approach the regular multiplier array used for multiply operations is also used for scaling operations, but with a pseudo-multiplication which multiplies either by 1 or another power of 2, so that the significand of the input floating-point operand can be passed through to the subnormal/rounding circuitry with no change to the significant digits of the significand.

Alternatively, another way of injecting the significand of the input floating-point operand onto the path into the subnormal handling circuitry or rounding determination circuitry can be to use a bypass path which bypasses the multiplier array. Hence, in response to the floating-point scaling instruction, the instruction decoder could control the processing circuitry to supply a significand of the input floating-point operand via the bypass path to bypass the multiply array, and the significand of the output floating-point operand can be generated based on an output of the bypass path. For example, the output of the bypass path may be supplied to a one or more shifters for generated shifted versions for dealing with cases when a subnormal input or output was detected, and could also be provided to the rounding determination circuitry for determining rounding status flags for identifying what rounding increments may need to be applied.

The input floating-point operand, the first and second floating-point operands and the output floating-point value may be represented using a floating-point representation comprising a fraction F represented using $N_F$ bits, an exponent E represented using $N_E$ bits, a sign bit S, so that a normal floating-point value in the floating-point representation represents a value of $(-1)^S*1.F*2^{E-B}$, where B is a bias value for the floating-point representation. The integer operand for the floating-point scaling operation comprises $N_{int}$ bits, where $N_{int} > N_E$. Hence, the integer operand may represent scaling factors over a wider possible range than can be represented for the exponent of the input floating-point operand.

In response to the floating-point scaling operation, the processing circuitry may map the integer operand to a reduced-range scaling factor value comprising $N_{scale}$ bits, where $N_E < N_{scale} < N_{int}$ and determine an exponent of the output floating-point value based on the reduced-range scaling factor value and the exponent of the input floating-point operand. More particularly, the exponent of the output floating-point value may be based on a sum of the reduced-range scaling factor value and the exponent of the input floating-point operand. Hence, although the integer operand has a certain number of bits $N_{int}$, the integer operand is mapped to a scaling factor value having a reduced range represented using $N_{scale}$ bits. This helps to reduce the circuit cost because narrower adders and signal paths can be used, and also helps improve circuit timing, because a narrower adder is faster at generating its result than a wider adder, so it is more likely the operation latency can fit within fewer clock cycles.

In particular, the inventor recognised that while the integer operand may be capable of representing values in a predetermined range, not all of the values within that range are able to give finite results for the floating-point scaling operation. The values within the predetermined range representable using the integer operand may include:

- a non-saturating subset of values, for which when the value X has one of the non-saturating subset of values, there is at least one possible value of the input floating-point operand for which the product of the input floating-point operand and the scaling factor $2^X$ would produce a result representable by the output floating-point value using the floating-point representation; and
- a saturating subset of values, for which when the value X has one of the saturating subset of values, it is guaranteed that for all possible values of the input floating-point operand the product of the input floating-point operand and the scaling factor $2^X$ will produce a result outside a range representable by the output floating-point value using the floating-point representation.

Hence, if the integer operand has one of the saturating subset of values, it is guaranteed that regardless of the value of the input floating-point operand, the result of the floating-point scaling operation will always be saturated (overflow or underflow), in which case it is not necessary to know the sum of the exponent of the input floating-point operand and the scaling factor. Hence, there is no need to provide an adder sufficient to add integer scaling factors across the full range of saturating subset of values. Instead, it is sufficient to limit the number of bits $N_{scale}$ of the reduced-range scaling factor value to a number of bits which is sufficient to represent (at least) all of the non-saturating subset of values. This means the latency of the addition and the circuit area cost can be reduced.

It is not necessary to be able to represent all of the saturating subset of values in the reduced-range scaling factor value as those values will always lead to overflow or underflow. However, it will be appreciated that the total number of non-saturating subset of values may be a value other than a power of 2, so the number of bits $N_{scale}$ bits may have to be set to the next highest power of 2, in which case the reduced-range scaling factor value may still be able to represent some of the saturating subset of values. Nevertheless, at least some of the saturating subset of values are excluded from being able to be represented by the reduced-range scaling factor value.

In some examples, the number of bits $N_{scale}$ of the reduced-range scaling factor value may be greater than or equal to Z, where Z is a result of rounding $\log_2(4*B+2*N_F+1)$ to the next highest integer, where B is the bias value and $N_F$ is the number of significand bits (excluding implicit non-stored bit) used for the floating-point representation used to represent the input and output floating-point values in the floating-point scaling operation.

Although Z represents the minimum number of bits needed to allow $N_{scale}$ to allow the reduced range scaling factor value to represent all of the non-saturating subset of values, for some implementations it may be desired to allow $N_{scale}$ to be greater than Z. For example, some implementations may support two or more different floating-point formats, but the circuit logic may be sized to handle the largest floating-point format supported (e.g. double-precision). Hence, even if performing the floating-point scaling operation on floating-point value in a smaller format (e.g. single-precision), the circuit paths and adders may be sized based on the bias value B and number of significand bits $N_F$ defined for the largest supported floating-point format. Hence, in some implementations, the number of bits $N_{scale}$ could be greater than or equal to Z, where Z is a result of rounding $\log_2(4*B_{max}+2*N_{Fmax}+1)$ to the next highest integer, where $B_{max}$ is the bias value and $N_{Fmax}$ is the number of significand bits (excluding implicit non-stored bit) used for the highest-precision floating-point representation supported by the processing circuitry.

Also, in some cases $N_{scale}$ may be greater than or equal to Z+1, as this allows the processing circuitry to set the most significant two bits of the scaling factor both equal to a most significant bit of the integer operand. The most significant bit of a signed integer operand represents the sign of the integer (values with a most significant bit of 0 are positive and values with a most significant bit of 1 are negative). By setting both of the upper two bits of the scaling factor to the sign bit of the integer value, this allows a straightforward check of whether adding the scaling factor to the exponent of the input floating-point value caused an overflow (in which case the output floating-point value should saturate to infinity). The overflow condition can be detected when the result of adding the reduced-range scaling factor value (with upper two bits both set to the sign bit of the integer) to the exponent of the input floating-point value gives a result which has different bit values for the upper two bits. For example, an XOR of the upper two bits of the add result can provide the indication of whether exponent overflow has occurred. Hence, for convenience of detecting overflow, it can be useful to expand $N_{scale}$ by 1 bit greater than the minimum number of bits needed to represent the non-saturating subset of values of the integer scaling factor.

As the scaling factor is reduced to $N_{scale}$ bits, the processing circuitry may, in response to the floating-point scaling instruction, also expand the exponent of the input floating-point operand to $N_{scale}$ bits to match the width of the scaling factor, so that it can be added to the reduced-range scaling factor value.

Although for a floating-point multiply operation, the existing number of exponents bits $N_E$ is sufficient to deal with the sum of the exponents required for generating the exponent of the product, to allow shared circuit signal paths to be used, which are also used for handling the floating-point scaling operation, in response the floating-point multiple instruction the processing circuitry may expand the exponents of the first and second floating-point operands from $N_E$ bits to $N_{scale}$ bits. Hence, the sharing of circuitry between the floating-point multiply and scaling operations may require slightly wider signal paths for the exponent processing in the floating-point multiply operation, but this may not affect circuit timing significantly as the exponent processing may be performed in the shadow of the slower latency of the multiplier array which is processing the significands of the first/second floating-point values for the multiply operation. For multiply operations, the exponent of the product floating-point value may be based on a sum of the expanded exponents of the first and second floating-point operands minus the bias value B. The same adder circuit could be used for adding the expanded exponents for a multiply operation that is also used for adding the exponent of the input floating-point operand to the reduced-range scaling factor for a scaling operation. The resulting exponent sum can then be used to determine shifts for subnormal handling, masks for determining rounding increments, etc. It will be appreciated that while the product exponent is dependent on the sum of the expanded exponents, a subsequent adjustment of the exponent could still be required, e.g. if the result is subnormal.

As the scaling factor is mapped to a reduced-range scaling factor which has fewer bits, so that it cannot represent all saturating subset of scaling values, this means that whether the result of the scaling operation causes an overflow or underflow may not be able to be determined from the sum of the reduced-range scaling factor value and the exponent of the input floating-point operand. Separately, the processing may comprise saturating scaling factor detection circuitry to detect whether the integer operand represents one of the saturating subset of values. When the integer operand represents a scaling factor which has one of the saturating subset of values which cannot be represented by the reduced-range scaling factor value, it is guaranteed that the result will be outside of the representable range for all possible values of the input floating-point operand. Hence, in response to the floating-point scaling instruction, when the saturating scaling factor detection circuitry detects that the integer operand represents one of the saturating subset of values, the processing circuitry may force the output floating-point value to represent a special value of zero or infinity. This approach can allow faster checking of whether the result of the scaling operation will exceed the bounds representable in floating-point format, than if the addition of the input exponent and scaling factor had been performed over the full range of $N_{int}$ bits of the integer operand and the saturating case had been determined from the output of the adder.

More particularly, in response to the floating-point scaling instruction, when the integer operand is mapped to a reduced-range scaling factor value of $N_{scale}$ bits as discussed above, the saturating scaling factor detection circuitry may detect whether the integer operand represents one of said saturating subset of scaling values based on a most significant bit of the integer operand and an OR reduction of an excluded subset of bits of the integer operand which are excluded from the reduced-range scaling factor value. This can allow the detection of whether the scaling factor is too large or too small to provide a finite floating-point value using a faster operation than could be done with an adder. For example, a combination of logic gates (NOT, AND or OR) can be used to perform the bounds checking to detect saturating scaling factors.

Floating-point values are typically stored using biased exponent values, where the true exponent (representing the power of 2 to which the significand needs to be raised to give the floating-point number represented) is equivalent to the result of subtracting a bias value B from the stored exponent E. The bias allows both positive and negative exponents to be represented using a monotonically increasing sequence of values of positive exponents from 0 to the maximum stored exponent value, which can simplify circuit logic for handling floating-point operations. This means that to perform a floating-point multiplication, as discussed above, the product exponents may be calculated based on the sum of the exponents of the first and second floating-point operands, minus the bias value B, to give a biased result exponent which is itself biased compared to the true exponent by the biased value B. Hence, one approach to handling a floating-point multiplication could be to first add the two exponents of the first and second floating-point operands, and then subtract the bias value B.

However, when the exponent processing logic is combined with logic for handling the floating-point scaling operation, there is a complication because the scaling factor represented by the integer operand would represent an unbiased power of 2, in contrast to the biased stored exponent of the input floating-point operand for the scaling operation. Hence the subtraction of the bias value would not be required for combining the biased exponent of the input floating-point operand the scaling factor in order to produce an output exponent in biased format (adding the integer scaling factor to the biased input exponent gives the biased output exponent).

Hence, the floating-point multiplying circuitry may comprise a first adder to subtract the bias value B from an exponent of the second floating-point operand; a multiplexer to select between an output of the first adder and the (reduced-range) scaling factor, depending on whether the floating-point multiplying circuitry is processing a floating-point multiply instruction or a floating-point scaling instruction; and a second adder to add a value selected by the multiplexer to a further exponent, where the further exponent is the exponent of the first floating-point operand when the floating-point multiplying circuitry is processing a floating-point multiply instruction, and the further exponent is the exponent of the input floating-point operand when the floating-point multiplying circuitry is processing a floating-point scaling instruction.

This approach can help to reduce the critical timing path through the exponent processing logic, because the latency for subtracting the bias value from an exponent in the multiply case is not on the critical path for the floating-point scaling operation. That is, by performing the subtraction of the bias value (needed for multiplies) before the multiplexer which selects between the second floating-point operand and the scaling factor, this can reduce logic depth.

In some implementations, the floating-point scaling instruction may be a scalar instruction which specifies the input floating-point operand and the integer operand as scalar operands (comprising only a single data element), and which controls the processing circuitry to generate a scalar output floating-point value based on the scaled version of the input floating-point operand.

However, the technique can also be applied to implementations where the floating-point scaling instruction is a vector instruction which specifies a first input vector and a second input vector. In this case, the first input vector may specify one or more data elements, each specifying a respective input floating-point operand. Similarly, the second input vector may specify one or more data elements each specifying a respective integer operand. The number of data elements in each vectors may be configurable, for example based on a parameter specified by the floating-point scaling instruction or specified in the control register. A vector of given size could be divided into 1, 2, 4 or 8 elements (or more), for example. Hence, in response to the floating-point scaling instruction, the instruction decoder may control the processing circuitry to generate a result vector comprising one or more data elements, where each data element specifies an output floating-point value which represents a result of performing the floating-point scaling operation on an input floating-point operand from a corresponding data element of the first input vector and an integer operand from a corresponding data element of the second input vector. In some circuit implementations, a number of lanes of processing circuit logic could be provided for processing each respective pair of data elements from the first and second input vectors. In that case, each lane of processing may comprise a separate instance of the floating-point multiplying circuitry (including the shared hardware circuitry) as discussed above. Alternatively, other implementations could perform the respective lanes of processing required for the vector instructions sequentially, with multiple passes through a shared instance of the floating-point multiplying circuitry. Other approaches may use an intermediate approach where a subset of the vector elements are processed in parallel using respective parallel circuit units, but processing of the whole vector requires multiple passes through those circuit units. Regardless of which of these approaches is taken, the use a vector instruction to trigger a number of independent floating-point scaling operations to be performed on respective pairs of floating-point and integer operands can improve performance, save power and reduce code density, by allowing some of the fetch, decode and issue overhead and cache capacity required for processing a given number of floating-point scaling operations to be reduced compared to implementing the same operations using scalar instructions.

It would also be possible to provide a vector floating-point scaling instruction which specifies a vector operand providing one or more elements representing a respective input floating-point operand, but which defines the integer scaling factor using a scalar integer operand, so that the same scaling factor is applied to each of the elements of the vector. In this case, the result vector would comprise one or more elements, where each element represents the result of processing a respective input floating-point operand from a corresponding element of the input vector, scaled by performing the floating-point scaling operation using the scaling factor indicated by the shared integer operand used for all lanes of the vector.

Similarly, the floating-point multiply instruction could be either a scalar instruction or a vector instruction. When the floating-point multiply instruction is a vector instruction specifying first and second input vectors each specifying respective floating-point operands in each of their data elements, then in response to the floating-point multiply instruction, the instruction decoder may control the processing circuitry to generate a result vector having one or more result data elements, where each of the result data elements specifies a product floating-point value which represents a result of performing of floating-point multiply operation on a pair of corresponding first and second floating-point operands from correspondingly positioned data elements of the first and second input vector.

Again, it would also be possible to provide a vector-by-scalar multiply instruction where each of the elements of a vector is multiplied by a common scalar operand.

Also, in some examples, the floating-point multiply instruction could be a multiply-accumulate instruction which as well as multiplying the first/second floating-point operands also adds the result to a third floating-point value.

Floating-Point Representation

Floating-point (FP) is a useful way of approximating real numbers using a small number of bits. The IEEE 754-2008 FP standard proposes multiple different formats for FP numbers, some that are commonly used are binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers consist of a sign bit, some number of biased exponent bits, and some number of fraction bits. Some FP formats of interest provide the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value: $-1^{sign} \times 1.\text{fraction} \times 2^e$, where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal). Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Processing circuitry which handles subnormals in hardware can speed up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n+i$, so a 4-bit two's complement integer would represent plus and minus one as:

+1=0001

−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are as follows:

| mode | definition |
| --- | --- |
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L (least) the least significant bit of the truncated value
G (guard) the next most significant bit (i.e. the first bit not included in the truncation)
S (sticky) the logical OR of all remaining bits that are not part of the truncation.

Given these three values and the truncated value, we can compute the correctly rounded value according to the following table (Table 1):

TABLE 1

| mode | change to the truncated value |
| --- | --- |
| RNE | increment if (L&G) \| (G&S) |
| RNA | increment if G |
| RZ | none |
| RP | increment if positive & (G \| S) |
| RM | increment if negative & (G \| S) |
| RX | set L if G \| S |

For example, consider multiplying two 4-bit significands, and then rounding to a 4-bit significand.

sig1=1011(decimal 11)

sig2=0111(decimal 7)

multiplying yields sig1×sig2=1001_101(decimal 77)

L Gss

The least significant bit of the truncated 4-bit result is labeled L, the next bit G, and s is the logical OR of the remaining bits labeled s (i.e. s=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

EXAMPLES

FIG. 1 schematically illustrates an example of a data processing apparatus 2. The data processing apparatus has a processing pipeline 204 which includes a number of pipeline stages. In this example, the pipeline stages include a fetch stage 206 for fetching instructions from an instruction cache 208; a decode stage 210 for decoding the fetch program instructions to generate micro-operations to be processed by remaining stages of the pipeline; an issue stage 212 for checking whether operands required for the micro-operations are available in a register file 214 and issuing micro-operations for execution once the required operands for a given micro-operation are available; an execute stage 216 for executing data processing operations corresponding to the micro-operations, by processing operands read from the register file 214 to generate result values; and a writeback stage 218 for writing the results of the processing back to the register file 214. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 214.

The execute stage 216 includes a number of processing units, for executing different classes of processing operation. For example the execution units may include a scalar arithmetic/logic unit (ALU) 220 for performing arithmetic or logical operations on scalar operands read from a scalar register file; a floating-point (FP) unit 222 for performing operations on FP values, a branch unit 224 for evaluating the outcome of branch operations and adjusting the program counter which represents the current point of execution accordingly; and a load/store unit 228 for performing load/store operations to access data in a memory system 208, 230, 232, 234. In this example the memory system include a level one data cache 230, the level one instruction cache 208, a shared level two cache 232 and main system memory 234. It will be appreciated that this is just one example of a possible memory hierarchy and other arrangements of caches can be provided. The specific types of processing unit 220 to 228 shown in the execute stage 216 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
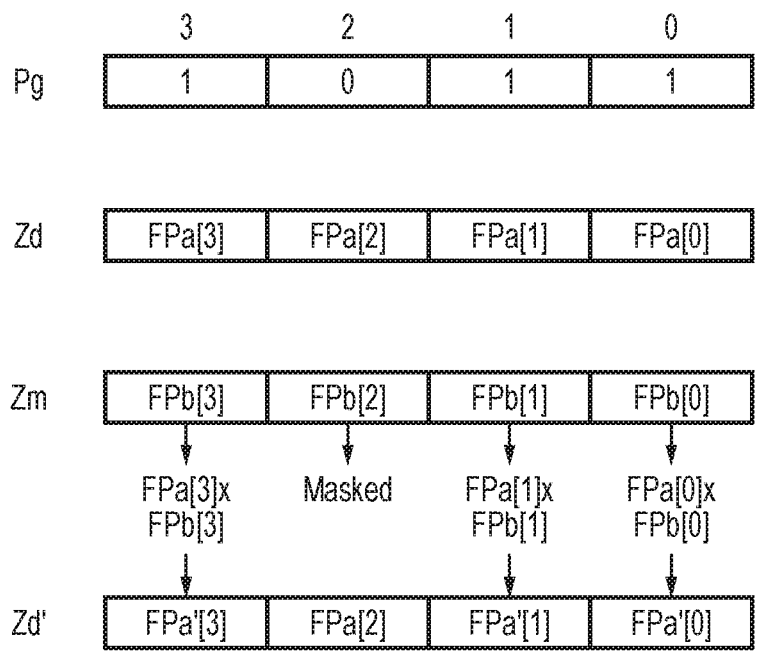
FIG. 2 shows an example of a floating-point multiply operation.

One example of a processing operation which may be supported by the FP unit 222 is a FP multiply operation. FIG. 2 shows an example of a FP multiply instruction FMUL which specifies a destination vector register Zd, a predicate register Pg and a vector source register Zm. In this example, the FP multiply instruction has a destructive encoding so that the destination register Zd also acts as a source register which specifies a first vector operand which comprises a number of data elements, each data element specifying a first FP value FPa[i] in a particular FP format (e.g. double precision FP). In this example the vector comprises four data elements, so i is between 0 and 3. Similarly, the source register Zm specifies a second vector operand, and each data element of the second vector operand specifies a corresponding FP value FPb[i]. The predicate register Pg specifies a number of predicate flags which each correspond to a corresponding element position in the first and second vectors, each predicate flag specifying whether the corresponding elements are active or inactive. The active lanes are marked with a predicate flag of 1 and the inactive lanes have a predicate flag of 0.

As shown in FIG. 2, when the FMUL instruction is executed, for each lane which has the predicate set to 1, the FP unit 222 multiplies the FP values in the corresponding data elements of the first and second vector operands to generate a product value which is written to the corresponding lane of the destination register Zd, overwriting the previous contents of that data element. For example, multiplying the FP values in element 0 of vectors Zd and Zm provides a new value FPa'[0] which is written to element 0 of the destination register Zd. In this example, as the predicate bit in lane 2 is 0, then the multiplication in that lane is masked and so element 2 of the destination register retains its previous value. This is an example of a merging predication, but it would also be possible to use a zeroing predication where the elements of the destination register corresponding to masked lanes have their values cleared to 0, instead of retaining their previous value.

While FIG. 2 shows an example of a destructive instruction coding, it would also be possible to provide a non-destructive instruction, in which the destination register is specified separately from the register providing the first vector source operand. For example, an instruction FMUL Zd, Pg, Zm, Zn may multiply pairs of elements stored in source vectors Zm and Zn to product a result vector stored to destination register Zd. Other variants of FP multiply instructions could also be provided, such as multiply-accumulate variants which add the product FP value to a third FP value, or which add all the product values in the respective lanes together to produce a scalar result, or which multiply each of the FP values in a vector by a common scalar value specified in a scalar operand.

Also, while FIG. 2 shows a vector instruction which performs a number of lanes of processing in response to one instruction, it would also be possible to provide a scalar FP multiply instruction which specifies two scalar FP values as operands and multiplies the two FP values together to generate a product value which is written to a result register.

Figures 3, 4:
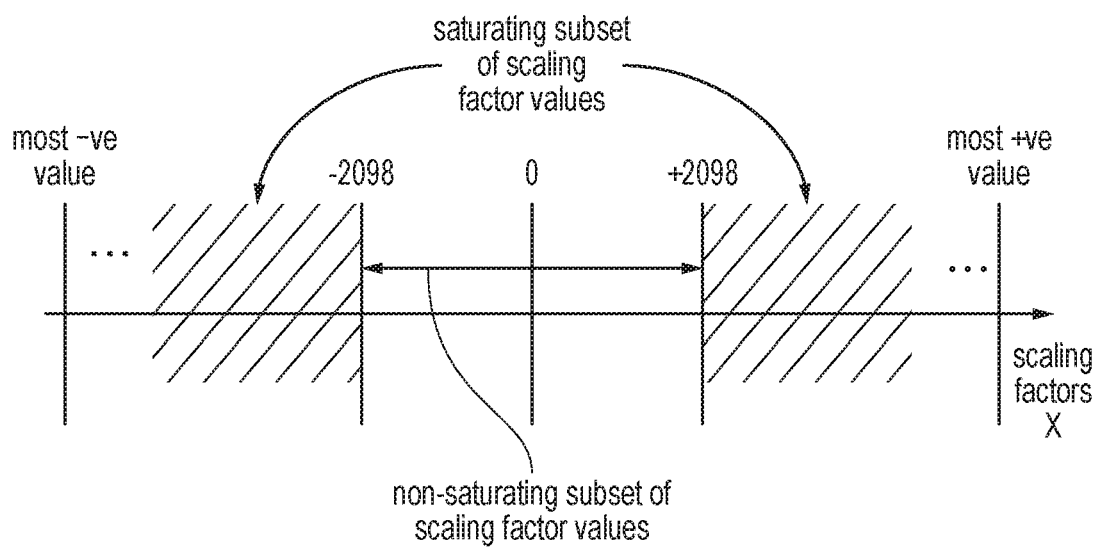
FIG. 3 shows an example of a floating-point scaling operation.
FIG. 4 shows the range of scaling factor values representable by an integer operand of the floating-point scaling operation, where the range includes a non-saturating subset of values and a saturating subset of values.

FIG. 3 shows an example of a FP scaling operation, which is another type of FP operation which may be supported by the FP unit 222. In the FP scaling operation, a FP number f and an integer i are provided as operands, and the floating-point scaling operation returns as a result the floating-point number $f*2^i$. For example, if f=1.5 and i=3 then the operation returns $1.5*2^3$=12.0. The integer can also be negative, so for example if f=1.5 and i=−2, the operation returns $1.5*2^{-2}$=0.375.

FIG. 3 shows an example of a vector FP scaling instruction FSCALE which specifies a destination register Zd, which also acts as one of the source registers, a second vector register Zm and a predicate register Pg. As in FIG. 2, the predicate register specifies mask bits for each lane of the vector. The destination register specifies a source vector operand, for which each element provides a FP value of a particular format (e.g. DP FP). The second source register Zm specifies a vector of integer values which act as the scaling factors for scaling the FP values in the corresponding lanes of the register Zd. Hence, in each active lane marked by a predicate value of 1, the FP unit 222 generates a result which is equivalent to multiplying the FP value in the corresponding lane of register Zd by 2 raised to the power of the integer value stored in the corresponding element of register Zm. For inactive lanes marked by a predicate flag of 0, the operation is masked, and so in this example the element at position 1 of the destination register Zd retains its previous value (again, a zeroing predication could be used instead if desired).

While FIG. 3 shows a variant where the integer scaling factor is specified separately for each vector lane, it would also be possible to define the integer scaling factor using a scalar register so that the same scaling factor is applied to each of the FP values in the respective elements of the vector.

In some circuit implementations, separate instances of processing circuitry may be provided for each lane of vector processing, so that the FP scaling operation can be performed in parallel for each lane. Other implementations may perform the lanes of processing for a vector fully or partially sequentially, so that the number of lanes for which processing circuit units are provided in hardware could be less than the maximum number of elements permitted in a vector register. If the maximum bit width that can be processed in parallel is narrower than the total bit width of one vector register then the vector operation can be processed in multiple passes through the narrower processing logic.

It will be appreciated that the number of data elements shown in FIG. 3 is just one example, and some systems may support variable element sizes so that a vector register of a given width can be sub-divided into different numbers of elements. For example a 256-bit register could be partitioned into four 64-bit elements, eight 32-bit elements or sixteen 16-bit elements as desired (which for the FP scaling operation could correspond to DP, SP or HP FP values respectively).

While FIG. 3 shows a vector FP scaling instruction, it would also be possible to provide a scalar FP scaling instruction which specifies a FP operand and an integer operand as scalar values, and which performs a single instance of the FP scaling operation to generate a result which is an output FP value which represents the input FP value multiplied by 2 raised to the power of the integer operand.

Fscale scaling factors ($2^i$) have a much wider range than FP numbers. Some of that extra range can still result in finite FP results, e.g. when a very small double precision (DP) number is scaled by a factor of 2000. There is no DP number $2^{2000}$, but we can simulate multiplying by $2^{2000}$ by using fscale. Even larger fscale inputs are possible, so we could scale by 1 million (multiply by $2^{1000000}$) but the answer in that case saturates to FP max or infinity.

FIG. 4 shows an example of the possible values of scaling factors which can be represented by a 64-bit integer. The most negative value (negative value having the largest absolute magnitude) which can be represented by signed 64-bit integer is −9,223,372,036,854,775,808 and the most positive value (positive value having the largest absolute magnitude) which can be represented is +9,223,372,036,854,775,807. This is a much wider range than the range of exponents −1022 to +1023 which can be represented by a 64-bit double-precision FP number, because the exponent is represented using only 11 bits rather than 64 bits (and stored exponent 0 is reserved for zero or subnormals).

For DP numbers, the input exponent is a biased 11-bit number (excess 1023). The minimum normal exponent is −1022, and the minimum subnormal value corresponds to $1.0 \times 2^{-1074}$. The largest normal value has exponent 1023, so representable numbers could have any of 1074 negative exponents, a zero exponent, or any of 1023 positive exponents, giving us essentially 1074+1+1023=2098 possible exponents. This puts a limit on non-saturating scaling factors: anything bigger than 2098 is guaranteed to saturate, anything smaller than negative 2098 is guaranteed to be zero before rounding.

Hence, as shown in FIG. 4, the possible range of scaling factors X which can be represented by a signed 64-bit integer includes a non-saturating subset of scaling factor values extending from −2098 to +2098 for which there is at least one FP value representable in double-precision form which, when scaled by one of the non-saturating subset of scaling factor values, can lead to a finite FP value which can still be represented as a normal or subnormal FP number. If the scaling factor represented by the integer in a FP scaling operation has one of the saturating subset of scaling factor values outside the range −2098 to +2098, then regardless of the value of the input FP operand for the FP scaling operation, the result will always saturate and so is guaranteed to be either zero or infinity, because the true result of the scaling would be larger or smaller than can be represented within the range representable using a double-precision FP value.

FIG. 4 shows the range of non-saturating subset of scaling factor values for an example using a 64-bit integer and 64-bit double-precision FP value. However, similarly for other FP formats such as half precision or single precision, the integer scaling factor can represent a range (surrounding zero) of non-saturating scaling factor values and a range (outside the non-saturating range) defining saturating scaling factor values. Note that for the non-saturating subset of scaling factor values, it is not guaranteed that the result will definitely not saturate, because there will still be some possible values of the input FP operand for which applying the scaling operation with that scaling factor could saturate. Instead, what is meant by the non-saturating subset of scaling factor values is that it is not guaranteed that the result of the scaling operation will saturate for all possible FP inputs, as there is at least one possible value of the input FP operand for which a non-saturating result may be generated in the scaling operation.

While the range of the non-saturating subset of scaling factor values is −2098 to +2098 for double precision FPs, more generally for a FP format which has an exponent represented using $N_E$ bits, a fraction represented using $N_F$ bits and a bias value of B:

The largest normal true exponent is B.
The minimum normal true exponent is −B+1
The minimum subnormal value corresponds to $1.0 \times 2^{-(B+N_F-1)}$.

Hence, the effective true exponent of a FP value (if a subnormal value could be mapped to a value $1.F*2^E$) can be any one of $(B+N_F-1)$ negative exponents, a zero exponent, or any of B positive exponents, giving $2B+N_F$ possible true exponents of an input FP value. Hence, any scaling factor larger than $+2B+N_F$ is guaranteed to saturate, and any scaling factor smaller than $-(2B+N_F)$ is guaranteed to be zero before rounding.

This means that the non-saturating subset of scaling factor values spans from $-(2B+N_F)$ to $+(2B+N_F)$, i.e. it includes $4B+2N_F+1$ different possible non-saturating scaling factor values. For HP, SP and DP formats, the subset of non-saturating scaling factor values therefore comprise 81, 555 and 4197 values respectively, which can be represented by a reduced-range value of 7, 10 or 13 bits respectively, as discussed further below.

For FP scaling operations for which both the input and output FP values are normal, the scaling operation can be implemented simply as an exponent adjustment, adding the signed integer scaling factor to the exponent of the input FP value to generate the exponent of the output FP value, except if the result is out of range, in which case the output is a special value of zero or ±infinity. However, if either the input or the output is subnormal, then the scaling operation cannot be performed using an exponent adjustment only, as a shift may be required, and possibly the addition of a rounding increment. The circuitry for identifying the subnormal inputs or outputs, correcting the significand of the FP value by shifting and adjusting the exponent if necessary, and if any less significant bits end up being shifted out of the significand of the output due to the subnormal adjustment, determining a rounding increment, can require a significant amount of extra processing circuitry logic provided in hardware which can increase the circuit area and power required. The inventor recognised that typically a FP multiply circuit for handling the FP multiply operation shown in FIG. 2 may already have all of the circuit elements, and so by reusing these for performing the FP scaling operation, the FP scaling operation can be implemented more efficiently, effectively as an extended form of FP multiplication.

Figure 5:
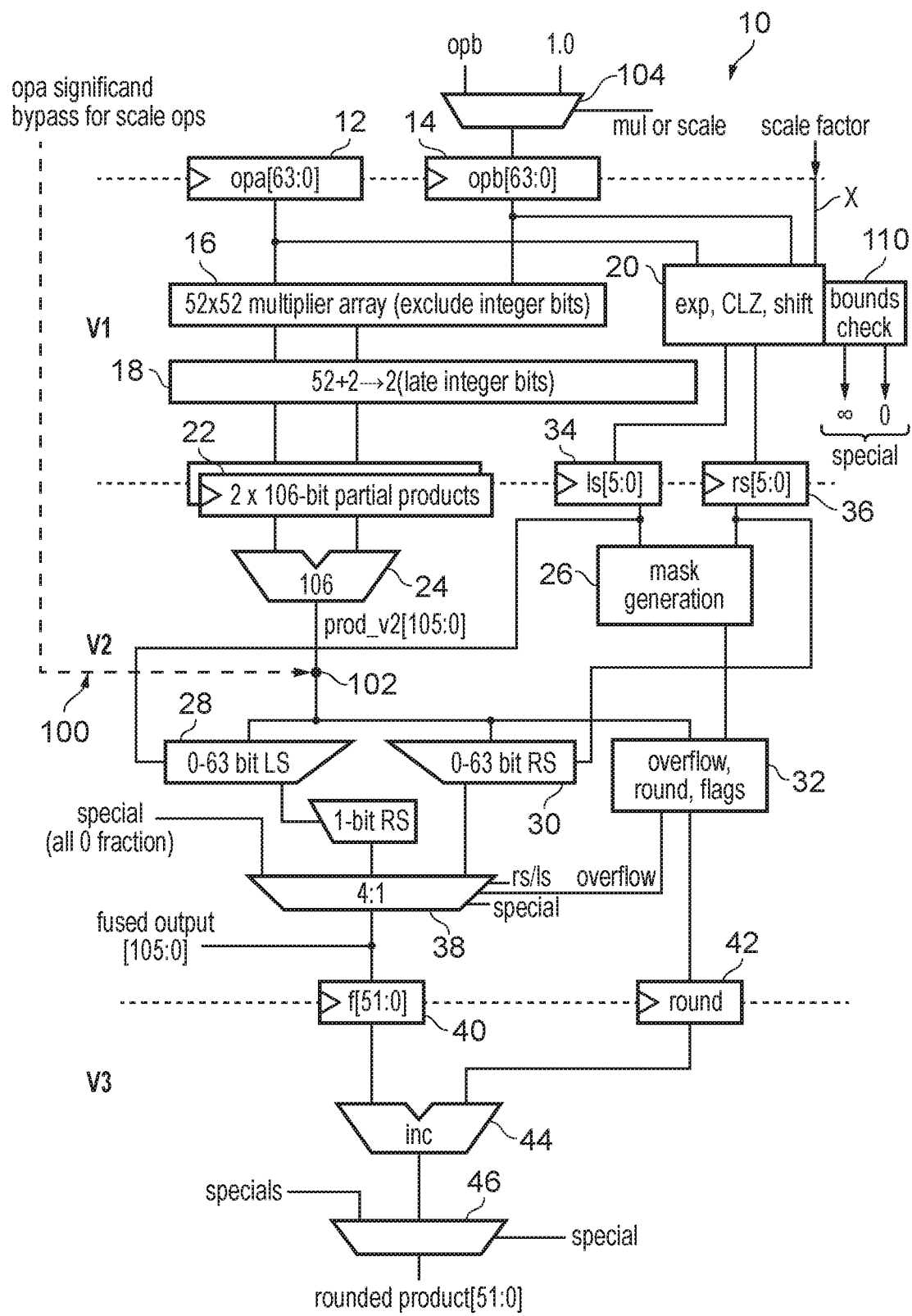
FIG. 5 shows an example of floating-point multiplying circuitry, which is shared for both the floating-point multiply operation and the floating-point scaling operation.

FIG. 5 shows an example of FP multiply circuitry 10 which can be included within the FP unit 222 of FIG. 1 for supporting the FP multiply operation and FP scaling operation of the types shown in FIGS. 2 and 3. In systems supporting vector instructions for performing these operations, it will be appreciated that multiple instances of the multiply circuitry shown in FIG. 5 could be provided for performing the operations on different lanes in parallel in response to a vector instruction. Alternatively, some implementations may have only a single instance of the FP multiply circuitry so that only scalar instructions are supported, or if vector instructions are supported then each vector lane is processed sequentially through multiple passes through the circuitry. Either way, the processing circuitry in the execute stage 216 may include at least one instance of the FP multiply unit 10 shown in FIG. 5.

First, the functionality of the FP multiply unit 10 is described in the context of processing a FP multiply operation to multiply two FP operands "opa" and "opb" which in this example are represented as double-precision FP numbers.

Operand "a" opa[63:0] (labelled 12) consists of sign bit signa, exponent bits expa[10:0], and fraction bits fraca[51:0], with a similar breakdown for operand "b" opb[63:0] (labelled 14). In the first stage (cycle) V1, fraca and fracb are multiplied together in a 52×52 array 16, after which the 52 partial products are reduced to two (106-bit) partial products using 3:2 compressors.

While the reduction is proceeding, exponent calculation circuitry 20 examines expa and expb to see if they are non-zero. Non-zero expa means that the implied integer bit of a is set (the value of opa is not subnormal or zero), and in this case the exponent calculation circuitry 20 signals to the reduction array (part 18) that another factor of fracb is to be added into the reduction. Similarly non-zero expb means that the implied integer bit of b is set, and so in this event another factor of fraca is added into the reduction. Finally, a single bit corresponding to the product of the implied integer bits is added into the reduction array 18.

While the array reduction proceeds, a count leading zero (CLZ) operation is also performed by the exponent calculation circuitry 20 on the significands of opa and opb, and the product exponent and shift amounts are computed. For calculating the product exponent in a multiply operation, this can be done as follows. Defining:

exp$a$=unbiased exponent of operand $a$, exp$b$=unbiased exponent of operand $b$, clz$a$=number of leading zeros in the significand of $a$, clz$b$=number of leading zeros in the significand of $b$, and letting clz be the logical OR of clza and clzb, then the unbiased result exponent before shifting is result_exp=expa+expb−clz.

Based on this calculated result exponent, the 106-bit product significand may require shifting so that bits [105:0] represent the product in a canonical form, either normalised if the product is normal, or with the correct number of leading zeros if the product is subnormal. This shifting could be in either direction namely:

1) a right shift when result_exp is below the minimum unbiased exponent value of −1022. In such cases the product significand is right shifted by one or more places in order to reach the minimum unbiased exponent value of −1022. Hence, the right shift amount may correspond to (−1022−result_exp).
2) a left shift, when there is one subnormal input and result_exp is greater than −1022. In this situation the product significand is shifted by zero or more places until either (whichever happens first): a) the exponent corresponding to the shifted value is equal to −1022, or b) the product significand becomes normal (i.e. the i bit is in position 104). The shift amount for the left shift case is determined based on the clz (leading zero count) of the significand of the one of opa, opb that was the subnormal input. Note also that for the left shifted result a 1-bit significand adjustment and corresponding exponent increase is required if this left-shifted result has overflowed.

Thus, in the FP multiplier (which outputs result values in the canonical DP format) the latter overflow case will be normalised (right shifted by 1 bit position with a corresponding exponent increment) in order to return the product in the desired format. The left and right shift amounts are placed in registers 34, 36.

In the second stage (cycle) V2, the two (106-bit) partial products held in registers 22 are added by the adder circuit 24, and masks based on the shift amounts 34, 36 are constructed by the mask generation circuit 26. These masks are used for early detection of overflow and rounding information. The generated masks are applied directly to the partial product sum before the sum is shifted by the left and right shifters 28 and 30. This application of the generated masks to the partial product sum is performed by comparison circuitry 32. The sum is shifted by left and right shifters 28 and 30, by the respective shift distances held in registers 34 and 36. Multiplexer 38 selects between the left-shifted and right-shifted sum in dependence on the rs/ls signal received from the exponent calculation circuitry 20, which indicates whether a right shift or left shift is needed (if neither is needed, an arbitrary one of the left- and right-shift cases can be selected, with the corresponding left/right shift amount set to zero). If an overflow is indicated by the comparison circuitry 32 then a 1-bit right shifted (1-bit RS) version of the left-shifted sum is selected. The multiplexer 38 is also capable of selecting a predefined "special" value, which is selected when a particular defined output is determined to be required (such a NaN, an infinity, or zero). From the multiplexer 38, if the operation is a fused multiply-add (FMA), the shifted 106-bit product is passed ("fused output") to a FP adder (not shown). If the operation is a multiply rather than an FMA, the unrounded top 52 fraction bits are stored in register 40, along with a 1-bit indicator "round" (in register 42) of whether the stored fraction has to be incremented for rounding. The rounding indicator is determined by comparison circuitry 32 based on the masks (which provide the L, G, S flags for rounding) and based on the selected rounding mode using the relations shown in table 1 above.

In the third stage (cycle) V3 the "round" bit is added to the product fraction by increment adder 44, and the final FP product is constructed from the pre-computed sign and exponent and the rounded fraction. A final multiplexer 46 chooses the FP number or a pre-computed special value (e.g., infinity or NaN or zero). Note also that in order to round at the beginning of stage V3, L, G, and S are computed in V2. This is done using two sets of masks, again shifting in the opposite direction and for the same distance as the product: right shifted masks for left shifted products, and left shifted masks for right shifted products.

The FP multiplier apparatus 10 shown in FIG. 5, with the cycle boundaries illustrated, allows early detection of the overflow, which means that the correct unrounded result can be forwarded to the adder (for the purpose of FMAs) in less than two cycles, and that the rounded FMUL result can be forwarded in less than 2.5 cycles.

Further details of the FP multiply unit 10 can be found in the U.S. Pat. No. 9,836,279 B2, assigned to Arm Limited of Cambridge, UK, the contents of which are incorporated herein entirely by reference. In particular, the referenced Patent provides further information on how to generate the masks in the mask generation circuit 26 and how to determine the overflow and rounding flags in the comparison circuitry 32.

It will be appreciated that the specific multiplier design shown in FIG. 5 is just one example of how circuitry for performing multiplication of two FP operands can be implemented. The described technique of using parts of a FP multiplier to support a FP scaling operation can also be applied to other types of FP multiply circuit.

As shown in FIG. 5, to support the FP scaling operation, a number of modifications are made to the basic FP multiplier design. For a FP scaling operation, the input FP operand is provided on the "opa" path of the FP multiplier circuit 10. Circuit elements are provided for allowing the significand of operand opa to effectively bypass the multiplier array 16, 18 so that it can be provided on the signal paths to the shifters 28, 30 effectively unchanged, as for a FP scaling operation there is no need to calculate a product based on the significand of the input FP value. This bypassing operation can be done in one of two ways. In one option, a bypass signal path 100 is provided, which injects the opa significand to a point 102 which is after the multiplier array 16, 18, but before the shifters 28, 30 and mask generation circuitry 26. This allows the significand of the input FP operand to be subject to rounding detection and subnormal correction shifts, without being multiplied by a second significand of a different FP operand.

Alternatively, instead of providing the bypass path 100, a multiplexer 104 could be provided at the opb input register 14, to select which value is provided as the second FP operand to the multiplier. Hence, for FP scaling operations, the bits of the register 14 which correspond to a significand could be selected by multiplexer 104 to be equal to the significand which a FP value representing 1.0*2⁰ would have. Hence, the multiplier array 16, 18 generates a product value which represents opa*1, so that the resulting product value is the same as the input significand. This approach can avoid needing to provide a second bypass path and an extra selection element partway through the multiply pipeline. Either approach can be used. Hence it will be appreciated that the elements 100, 104 are alternatives and do not both need to be provided.

Figure 6:
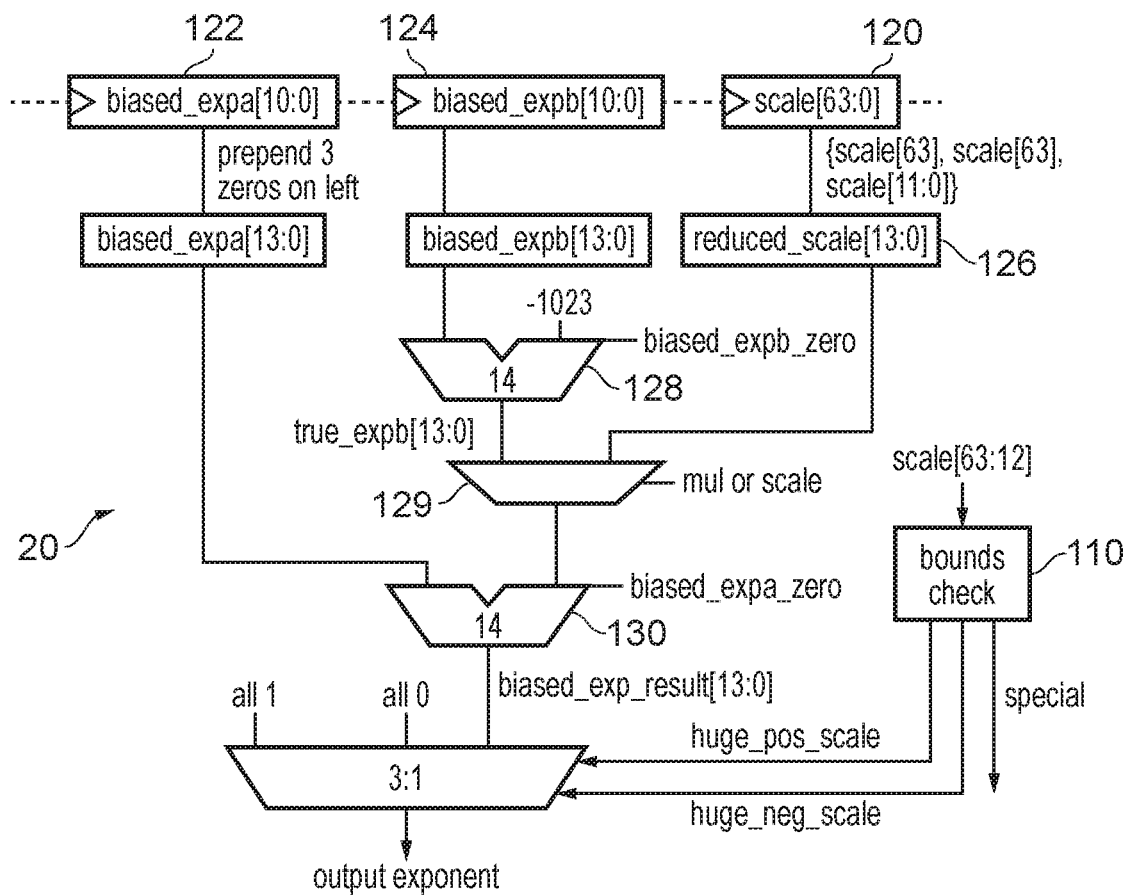
FIG. 6 shows an example of circuitry for generating an output exponent for the floating-point multiply and scaling operations.
Figure 7:
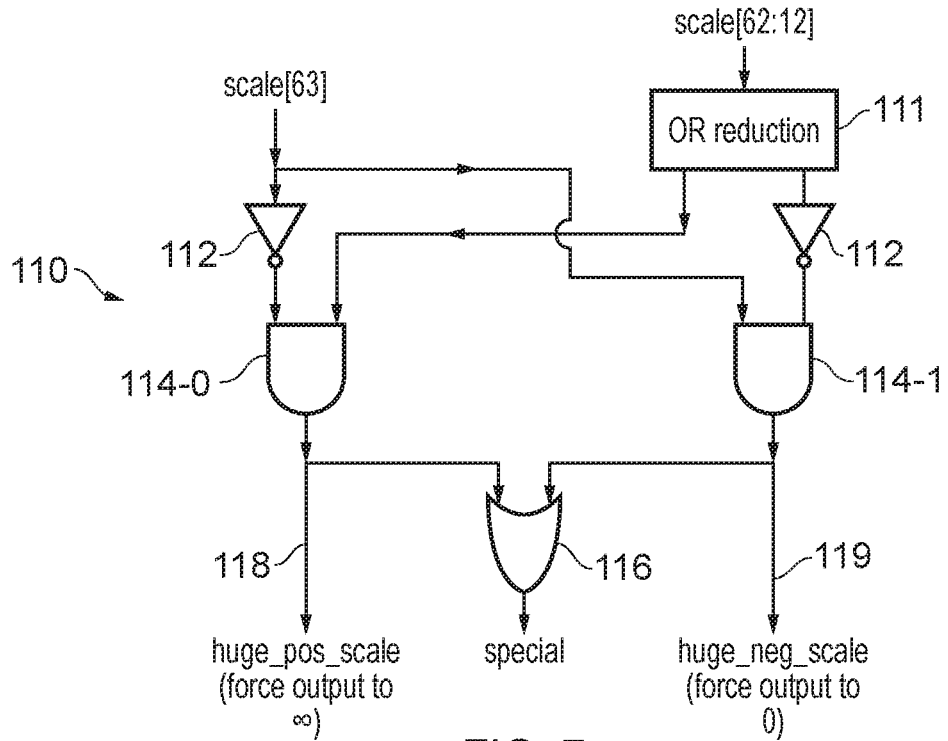
FIG. 7 shows bounds checking circuitry.

Also, the exponent processing circuitry 20 for processing the exponents expa, expb is expanded to also receive the scale vector X which is specified by the integer operand for the FP scaling operation, and the circuitry is modified to accommodate processing of the scaled vector. Also some bounds checking circuitry 110 is provided for checking whether the scaling factor X has one of the saturating subset of values as discussed with respect to FIG. 4. FIGS. 6 and 7 show the modified exponent processing circuitry 20 and the bound checking circuitry 110 in more detail.

As shown in FIG. 6, the exponent processing circuitry 20 receives the biased exponents expa, expb 122, 124 of the two FP operands opa, opb for a multiply operation. For a FP scaling operation, the biased exponent expa of the input FP value is received on the expa path 122 and the expb path 124 would be unused. The integer operand provided for a FP scaling operation is provided as the scaling factor 120. The scaling factor 120 is a 64-bit value, whereas the biased exponents expa, expb are 11-bit values. One approach for adding these could be to expand the FP exponents 122, 124 to 64-bit signed values, however, doing exponent arithmetic using 64-bit adds would make it very difficult for the FP multiply unit to meet the timing constraints required for fitting the multiply operation into three clock cycles as shown in FIG. 5.

As discussed above with reference to FIG. 4, in practice the full 64-bit addition is not needed because only the non-saturating subset of scaling factor values can lead to finite FP output values, and if the scaling factor 120 has a value within the saturating subset of the scaling factor values then the result is guaranteed to be zero or infinity, and in that case there is no need to perform an exponent add. Therefore, to reduce the size of the adders in the exponent processing logic 20, the scaling factor is converted to a reduced-range scaling factor 126 which has sufficient bits to be able to represent all of the possible non-saturating subset of scaling factor values but does not need to require any additional bits for accommodating all of the saturating subset of scaling factor values. Instead the bounds check circuitry 110 enables the saturating cases to be identified.

As discussed above, for double precision FP the limit on non-saturating scaling factors is ±2098 and representing all of those scaling factor values within the non-saturating range −2098 to +2098 (4197 distinct values) requires a 13-bit number, since 12 bits is too small ($2^{12}$=4096). More generally, for any arbitrary FP format for which the number of fractional bits is $N_F$ and the bias value B, the minimum number of bits for representing all possible non-saturating scaling factor values is $\log_2(4*B+2*N_F+1)$, rounded to the next highest integer. In practice, it can be useful to provide one additional bit for the reduced-range scaling factor 126, so that two sign bits can be included for overflow detection. Hence, the least significant 12 bits of the reduced-range scaling factor 126 are set equal to the least significant 12 bits of the original integer scaling value 120, and the most significant bit of the scaling factor 120 is copied to both of the most significant 2 bits of the reduced-range scaling factor 126. This allows exponent overflow (when adding the biased expa and reduced-range scaling factor generates a saturating exponent value which is too large to represent as a DP number) to be detected more easily, as the overflow can be detected from an XOR of the upper two bits of the sum result (if the upper two bits are different, this indicates the presence of overflow. Hence, in this example actually a 14-bit reduced-range scaling value 126 is generated, although in practice the 14$^{th}$ bit is simply for convenience of detecting overflow rather than being required for representing all the non-saturating subset of scaling factor values, and other techniques for detecting overflow could be used.

The biased exponents 122, 124 of the two FPs operands A and B for the multiply operation are similarly expanded to 14 bits to match the reduced range scaling factor 126. For a FP multiply operation, the biased exponents expa, expb are added. The subtraction of the clz count is not shown in FIG. 6, but would still be performed as shown above (e.g. a further adder after the final multiplexer could subtract the clz to correct for subnormal inputs).

However, as FP multiplies a*b return a biased exponent from two biased inputs, extra arithmetic may be used to generate the correct product exponent as a biased exponent:

true_expa = biased_expa − 1023 true_expb = biased_expb − 1023 biased_exp_prod = true_exp_prod + 1023

= true_expa + true_expb + 1023

= biased_expa − 1023 + biased_expb − 1023 + 1023

= (biased_expa + biased_expb) − 1023

For some FP multipliers, the sum of the biased expa and expb would be calculated first, before subtracting the bias constant of 1023. However, this scheme is problematic for fscale because the scale factor is a true exponent, not a biased exponent. We simplify the problem by converting expb to a true exponent for multiplies. Since the scale factor is already a true exponent, the arithmetic becomes:

$$\begin{aligned} \text{biased\_exp\_prod} &= \text{true\_exp\_prod} + 1023 \\ &= \text{true\_expa} + \text{true\_expb} + 1023 \\ &= \text{biased\_expa} - 1023 + \text{true\_expb} + 1023 \\ &= \text{biased\_expa} + \text{true\_expb} \\ &= \text{biased\_expa} + (\text{biased\_expb} - 1023). \end{aligned}$$

By subtracting 1023 from biased_expb first using a first adder 128, a multiplexer 129 can then simply select between the output of the first adder 128 and the reduced-range scaling factor 126, and then a second adder 130 can add the output of the multiplexer 129 to biased_expa. In contrast, if the biased versions of expa, expb had been added first, then extra correction of the scaling factor 126 would be needed to account for the difference in biased representations between the FP exponents and the integer scaling factor.

Scale inputs are actually 64-bit signed values, not 13-bit signed values, and doing exponent arithmetic using 64 bits would not make timing, so as discussed above we reduce the 64-bit scale factor scale[63:0] to accommodate every non-saturating value as follows: reduced_scale[13:0]={scale[63], scale[63], scale[11:0]}.

In summary, the two input biased exponents are expanded to 14 bits by prepending 3 zero bits to each. Exponent expb is then debiased (converted to a true exponent) by subtracting the bias (1023), using first adder 128. There is a complication in IEEE 754 exponent logic in that biased exponent 0 represents true exponent −1022, so we set the adder carry-in for first adder 128 to compensate for this case. The scale factor 120 is also converted to a reduced-range 14-bit true exponent value 126 as discussed above. A multiplexer 129 chooses the appropriate true exponent based on whether this is a multiply or scaling operation, and the true exponent is added to biased exponent expa by second adder 130 to get the biased exponent of the result. We again deal with the complication of biased expa of zero being a special case by setting the carry-in to the final adder 130 if the input biased exponent expa is zero. Also, while not shown in FIG. 6, when a FP input value is subnormal, a correction to the result exponent can be applied based on a leading zero count clz—for FP multiply operations the clz is the OR of the clzs in the two FP operands opa, opb, and for FP scaling operations the clz is the clz of the input FP operand opa.

The biased result exponent is examined for saturation conditions: if it is negative or zero, then the multiplier product significand has to be right shifted until the product is representable as an FP number; if the product significand is subnormal then it needs to be left shifted for positive scale factors (with the corresponding exponent decrement); if the final biased exponent is greater than 2046 then the result must saturate to max or infinity. All of this logic is mostly unchanged from the existing multiplier once the larger true exponents are used.

The small amount of additional logic is the bounds checking circuitry 110 for dealing with large magnitude scale values, so any "huge_pos_scale" or "huge_neg_scale" will result in saturation or zeros. FIG. 7 shows the bounds checking circuitry 110 in more detail. The bounds checking circuitry 110 comprises OR reduction circuitry 111, inverters 112, AND gates 114 and OR gate 116. The bounds checking circuitry 110 treats larger positive and negative scale values separately from the non-saturating scaling factor values which can be represented using the reduced-range value 126:

huge_pos_scale=~scale[63]&|scale[62:12]

huge_neg_scale=scale[63]&~|scale[62:12], where:
- ~represents logical NOT (an inversion as performed by inverters 112)
- & represents logical AND (as performed by AND gates 114)
- | represents an OR reduction of bits [62:12] of the scaling factor 120, where an OR reduction of bits [62:12] means the result of sequentially applying OR operations, where the first OR operation combines 2 of the selected bits in a logical OR operation, and each successive OR operation combines the result of the last OR operation with another of the selected bits, until each of the bits has been combined. For example, an OR reduction of 4 values A, B, C, D is equal to ((A OR B) OR C) OR D. The order in which the bits are folded into the OR reduction does not matter. Hence, in practice the OR reduction circuitry 111 may comprise a tree of OR gates which perform some of the OR operations in parallel to arrive at the OR reduction faster.

The output of AND gate 114-0 indicates the huge_pos_scale signal 118 which if 1 indicates that the result of the FP scaling operation is too large to be represented in DP FP value and so the result should saturate to infinity (+infinity if the input FP operand was positive, and −infinity if the input FP operand was negative). The output of AND gate 114-1 indicates the huge_neg_scale signal 119 which if 1 indicates that the result of the FP scaling operation is too small to be represented as either a normal or subnormal DP FP value and so the result should saturate to zero. The OR gate 116 combines signals 118, 119 in a logical OR operation—if either is 1 then the multiplexer 38 in the multiply circuitry of FIG. 5 should select an all-0 fraction to represent a special value (both 0 and ±infinity have a fraction of 0 in FP representation).

Figure 8:
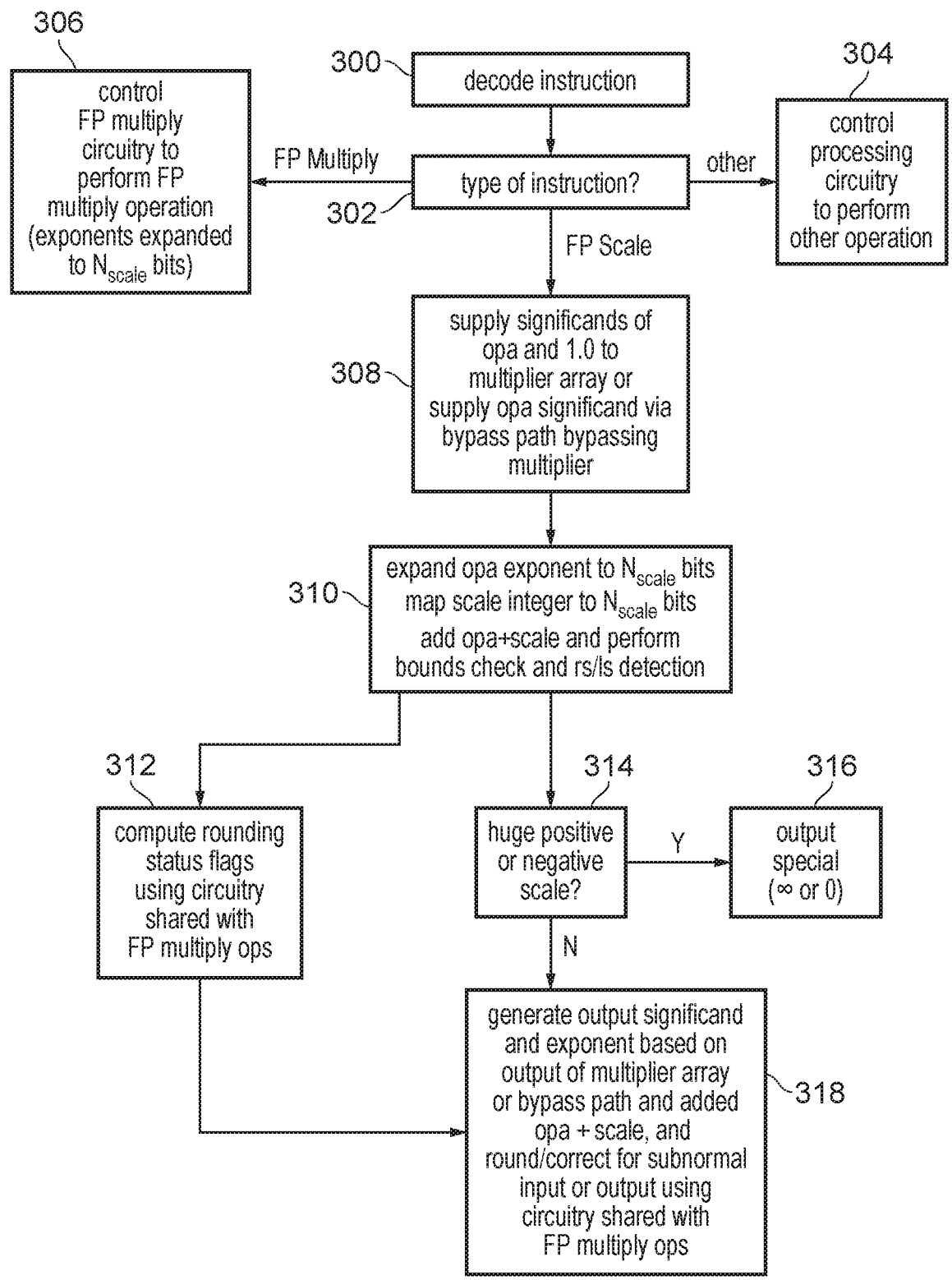
FIG. 8 is a flow diagram showing method of processing instructions.

FIG. 8 illustrates a flow diagram showing a method of processing instructions. At step 300 the next instruction is decoded and at step 302 the instruction decoder 210 identifies the type of instruction that has been decoded. If the instruction is not a FP multiply or scaling instruction then at step 304 the processing circuitry 216 is controlled to perform some other operation as represented by the decoded instruction.

If the decoded instruction is a FP multiply instruction then at step 306 the FP multiply circuitry 10 is controlled to perform a FP multiply operation. Other than the fact that the exponents of the multiply operand are expanded to a greater number of bits $N_{scale}$ than would be the case for FP multipliers which only perform multiply operations and do not support FP scaling operations, the multiply operation at step 306 can be performed as described in FIGS. 7A and 7B of the U.S. Pat. No. 9,836,279 incorporated by reference as discussed above.

Alternatively, if the decoded instruction is identified at step 302 as a FP scaling instruction, then at step 308 the instruction decoder 210 controls the FP multiply unit 10 to supply the significands of opa and 1.0 to the multiplier array, where the significand of opa is the significand of the input FP operand of the FP scaling instruction. Alternatively, the opa significand can be supplied into the multiplier via the bypass path 100 shown in FIG. 5 to bypass the multiplier array 16. Either way, this will result in a product value at node 102 being provided which corresponds in value to the product of the input floating-point operand and 1, i.e. the opa significand is effectively unchanged, other than being expanded to a larger bitwidth.

Also, at step 310 the exponent of the input FP operand opa is expanded to $N_{scale}$ bits and the scaling integer operand specified by the FP scaling instruction is reduced to $N_{scale}$ bits, for example by taking the least significant ($N_{scale}-2$) bits of the integer scaling factor 120 and appending the most significant bit of the integer scaling factor twice at the upper end of the remapped reduced-range scaling value 126. The exponent processing circuitry 20 adds the OPA exponent 122 and the reduced range scaling factor 126 using adder 130, and checks for saturation and subnormal corrections. Also, the instruction decoder controls the bounds checking circuitry 110 to perform the bounds check for saturating integer scaling factor values. Also the logic within the exponent processing circuitry 20 for checking whether a left or right shift is required, and if so determining the appropriate shift amount, is invoked.

At step 312 the rounding status flags are computed based on the shift amounts determined by the exponent processing logic based on the sum of the OPA exponent and the scaling factor, and based on masks applied to the significand. These masks are generated in the same way as for multiplies in the way described in the referenced patent mentioned above. Also at step 314 the bounds checking circuitry 110 determines whether the scaling factor represented by the integer operand is one of the saturating subset of scaling factors (either a huge positive number or a huge negative number as indicated by signals 118, 119), and if so then at step 316 the FP multiply unit forces the output to be a special FP number representing either zero in the case of a huge negative scaling factor or ±infinity in the case of a huge positive scaling factor. For both zero or infinity this means that multiplexer 38 selects an all zero fraction as the output value, while the exponent processing logic 20 will select and all-1 exponent to represent infinity when there is a huge positive scaling factor and an all-0 exponent to represent zero when there is a huge negative scaling factor.

When the bounds checking circuitry determines that there is not a huge positive or negative scaling factor, then at step 318 the output significand and exponent of the output FP value are generated based on the product significand output by the multiplier array 16, 18, 24 or the bypassed significand from the bypass path 100, with a possible shift applied depending on the shift amounts 34, 36 calculated by the exponent processing logic based on the sum of the input exponent expa 122 and the scaling factor 120, and a rounding increment applied if necessary as determined by mask generation circuitry 26 and rounding comparison circuitry 32, based on the currently selected rounding mode and rounding status flags L, G, S as described above. Hence, by reusing the subnormal handling circuitry 34, 36, 28, 30, 38 and rounding circuitry 26, 32 which is provided for FP multiply operations to also perform FP scaling operations, this saves circuit area and provides a more efficient circuit implementation. Note that for the FP scaling operation, the provision of hardware for handling subnormals means that the output reaches the final pipeline stage V3 with the same latency regardless of whether the inputs or outputs are subnormal or normal.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

an instruction decoder to decode instructions; and processing circuitry to perform data processing in response to the instructions decoded by the instruction decoder; in which:

the processing circuitry comprises floating-point multiplying circuitry to perform, in response to a floating-point multiply instruction decoded by the instruction decoder, a floating-point multiply operation to multiply first and second floating-point operands to generate a product floating-point value;

in response to a floating-point scaling instruction specifying an input floating-point operand and an integer operand, the instruction decoder is configured to control the processing circuitry to perform a floating-point scaling operation to generate an output floating-point value corresponding to a product of the input floating-point operand and a scaling factor $2^X$, where X is an integer represented by the integer operand;

the processing circuitry is configured to perform the floating-point scaling operation using shared hardware circuitry of the floating-point multiplying circuitry which is also used for performing the floating-point multiply operation in response to the floating-point multiply instruction;

the floating-point multiplying circuitry comprises a multiplier array;

in response to the floating-point multiply instruction, the instruction decoder is configured to control the multiplier array to add partial products generated based on significands of the first and second floating-point operands; and in response to the floating-point scaling instruction, the instruction decoder is configured to control:

the multiplier array to add partial products generated based on a significand of the input floating-point operand and a predetermined constant significand in which only a single bit is set to 1;

or the processing circuitry to supply a significand of the input floating-point operand via a bypass path bypassing the multiplier array, and generate a significand of the output floating-point operand based on an output of the bypass path.

2. The apparatus according to claim 1, in which the shared hardware circuitry comprises at least one of:
  subnormal handling circuitry to handle subnormal inputs or outputs of the floating-point multiply operation or the floating-point scaling operation; and
  rounding determination circuitry to determine a rounding increment to be applied to an output of the floating-point multiply operation or the floating-point scaling operation.

3. The apparatus according to claim 1, in which when at least one of the input floating-point operand and the output floating-point operand is subnormal, the processing circuitry is configured to perform the floating-point scaling operation with a same latency as when both the input floating-point operand and the output floating-point operand are normal.

4. The apparatus according to claim 1, in which the predetermined constant significand is equal to the significand of a floating-point value representing a numeric value of 1.

5. The apparatus according to claim 1, in which:
  the input floating-point operand, the first and second floating-point operands and the output floating-point value are represented using a floating-point representation comprising a fraction F represented using $N_F$ bits, an exponent E represented using $N_E$ bits, and a sign bit S, so that a normal floating-point value in the floating-point representation represents a value of $(-1)^S * 1.F * 2^{E-B}$, where B is a bias value for the floating-point representation; and
  the integer operand for the floating-point scaling operation comprises $N_{int}$ bits, where $N_{int} > N_E$.

6. The apparatus according to claim 5, in which in response to the floating-point scaling operation, the processing circuitry is configured to:
  map the integer operand to a reduced-range scaling factor value comprising $N_{scale}$ bits, where $N_E < N_{scale} < N_{int}$, and
  determine an exponent of the output floating-point value based on the reduced-range scaling factor value and the exponent of the input floating-point operand.

7. The apparatus according to claim 6, in which the integer operand is capable of representing values within a predetermined range, said values within said predetermined range including:
  a non-saturating subset of values, for which when the value X has one of the non-saturating subset of values, there is at least one possible value of the input floating-point operand for which the product of the input floating-point operand and the scaling factor $2^X$ would produce a result representable by the output floating-point value using the floating-point representation; and
  a saturating subset of values, for which when the value X has one of the saturating subset of values, it is guaranteed that for all possible values of the input floating-point operand the product of the input floating-point operand and the scaling factor $2^X$ will produce a result outside a range representable by the output floating-point value using the floating-point representation; and
  said reduced-range scaling factor value has a number of bits $N_{scale}$ sufficient to represent all of said non-saturating subset of values.

8. An apparatus comprising:
  an instruction decoder to decode instructions; and
  processing circuitry to perform data processing in response to the instructions decoded by the instruction decoder; in which:
  the processing circuitry comprises floating-point multiplying circuitry to perform, in response to a floating-point multiply instruction decoded by the instruction decoder, a floating-point multiply operation to multiply first and second floating-point operands to generate a product floating-point value;
  in response to a floating-point scaling instruction specifying an input floating-point operand and an integer operand, the instruction decoder is configured to control the processing circuitry to perform a floating-point scaling operation to generate an output floating-point value corresponding to a product of the input floating-point operand and a scaling factor $2^X$, where X is an integer represented by the integer operand;
  the processing circuitry is configured to perform the floating-point scaling operation using shared hardware circuitry of the floating-point multiplying circuitry which is also used for performing the floating-point multiply operation in response to the floating-point multiply instruction;
  the input floating-point operand, the first and second floating-point operands and the output floating-point value are represented using a floating-point representation comprising a fraction F represented using $N_F$ bits, an exponent E represented using $N_E$ bits, and a sign bit S, so that a normal floating-point value in the floating-point representation represents a value of $(-1)^S * 1.F * 2^{E-B}$, where B is a bias value for the floating-point representation;
  the integer operand for the floating-point scaling operation comprises $N_{int}$ bits, where $N_{int} > N_E$;
  in response to the floating-point scaling operation, the processing circuitry is configured to: map the integer operand to a reduced-range scaling factor value comprising $N_{scale}$ bits, where $N_E < N_{scale} < N_{int}$, and determine an exponent of the output floating-point value based on the reduced-range scaling factor value and the exponent of the input floating-point operand; and
  $N_{scale}$ is greater than or equal to Z, where Z is a result of rounding $\log_2(4*B+2*N_F+1)$ to the next highest integer.

9. The apparatus according to claim 8, in which $N_{scale}$ is greater than or equal to Z+1, and in response to the floating-point scaling operation, the processing circuitry is configured to set the most significant two bits of the reduced-range scaling factor both equal to a most significant bit of the integer operand.

10. The apparatus according to claim 6, in which in response to the floating-point scaling instruction, the processing circuitry is configured to expand the exponent of the input floating-point operand to $N_{scale}$ bits, and determine the exponent of the output floating-point value based on a sum of the expanded exponent of the input floating-point operand and the reduced-range scaling factor value.

11. The apparatus according to claim 6, in which in response to the floating-point multiply instruction, the processing circuitry is configured to expand the exponents of the first and second floating-point operands to $N_{scale}$ bits, and determine the exponent of the product floating-point value based on a sum of the expanded exponents of the first and second floating-point operands minus the bias value B.

12. An apparatus comprising:
  an instruction decoder to decode instructions; and
  processing circuitry to perform data processing in response to the instructions decoded by the instruction decoder; in which:

the processing circuitry comprises floating-point multiplying circuitry to perform, in response to a floating-point multiply instruction decoded by the instruction decoder, a floating-point multiply operation to multiply first and second floating-point operands to generate a product floating-point value;

in response to a floating-point scaling instruction specifying an input floating-point operand and an integer operand, the instruction decoder is configured to control the processing circuitry to perform a floating-point scaling operation to generate an output floating-point value corresponding to a product of the input floating-point operand and a scaling factor $2^X$, where X is an integer represented by the integer operand;

the processing circuitry is configured to perform the floating-point scaling operation using shared hardware circuitry of the floating-point multiplying circuitry which is also used for performing the floating-point multiply operation in response to the floating-point multiply instruction;

the input floating-point operand, the first and second floating-point operands and the output floating-point value are represented using a floating-point representation comprising a fraction F represented using $N_F$ bits, an exponent E represented using $N_E$ bits, and a sign bit S, so that a normal floating-point value in the floating-point representation represents a value of $(-1)^S * 1.F * 2^{E-B}$, where B is a bias value for the floating-point representation;

the integer operand for the floating-point scaling operation comprises $N_{int}$ bits, where $N_{int} > N_E$;

the processing circuitry comprises saturating scaling factor detection circuitry to detect whether the integer operand represents one of a saturating subset of values, for which when the value X has one of the saturating subset of values, it is guaranteed that for all possible values of the input floating-point operand the product of the input floating-point operand and the scaling factor $2^X$ will produce a result outside a range representable by the output floating-point value using the floating-point representation; and in response to the floating-point scaling instruction, when the saturating scaling factor detection circuitry detects that the integer operand represents one of the saturating subset of values, the processing circuitry is configured to force the output floating-point value to represent a special value of zero or infinity.

13. The apparatus according to claim 12, in which in response to the floating-point scaling instruction, the processing circuitry is configured to map the integer operand to a reduced-range scaling factor value comprising $N_{scale}$ bits, where $N_E < N_{scale} < N_{int}$; and the saturating scaling factor detection circuitry is configured to detect whether the integer operand represents one of said saturating subset of scaling values based on a most significant bit of the integer operand and an OR reduction of an excluded subset of bits of the integer operand which are excluded from the reduced-range scaling factor value.

14. The apparatus according to claim 5, in which the floating-point multiplying circuitry comprises:

a first adder to subtract the bias value B from an exponent of the second floating-point operand;

a multiplexer to select between an output of the first adder and the scaling factor, depending on whether the floating-point multiplying circuitry is processing a floating-point multiply instruction or a floating-point scaling instruction; and a second adder to add a value selected by the multiplexer to a further exponent, where the further exponent is the exponent of the first floating-point operand when the floating-point multiplying circuitry is processing a floating-point multiply instruction, and the further exponent is the exponent of the input floating-point operand when the floating-point multiplying circuitry is processing a floating-point scaling instruction.

15. The apparatus according to claim 1, in which the floating-point scaling instruction is a vector instruction specifying a first input vector and a second input vector, the first input vector specifying one or more data elements each specifying a respective input floating-point operand;

the second input vector specifying one or more data elements each specifying a respective integer operand; and in response to the floating-point scaling instruction, the instruction decoder is configured to control the processing circuitry to generate a result vector comprising one or more data elements each specifying an output floating-point value representing a result of performing the floating-point scaling operation on an input floating-point operand from a corresponding data element of the first input vector and an integer operand from a corresponding data element of the second input vector.

16. The apparatus according to claim 1, in which the floating-point multiply instruction is a vector instruction specifying a first input vector and a second input vector, the first input vector specifying one or more data elements each specifying a respective first floating-point operand;

the second input vector specifying one or more data elements each specifying a respective second floating-point operand; and in response to the floating-point multiply instruction, the instruction decoder is configured to control the processing circuitry to generate a result vector comprising one or more data elements each specifying a product floating-point value representing a result of performing the floating-point multiply operation on a first floating-point operand from a corresponding data element of the first input vector and a second floating-point operand from a corresponding data element of the second input vector.

\* \* \* \* \*